H. E. HUNT.
STORAGE BATTERY CONTAINER.
APPLICATION FILED NOV. 15, 1918.

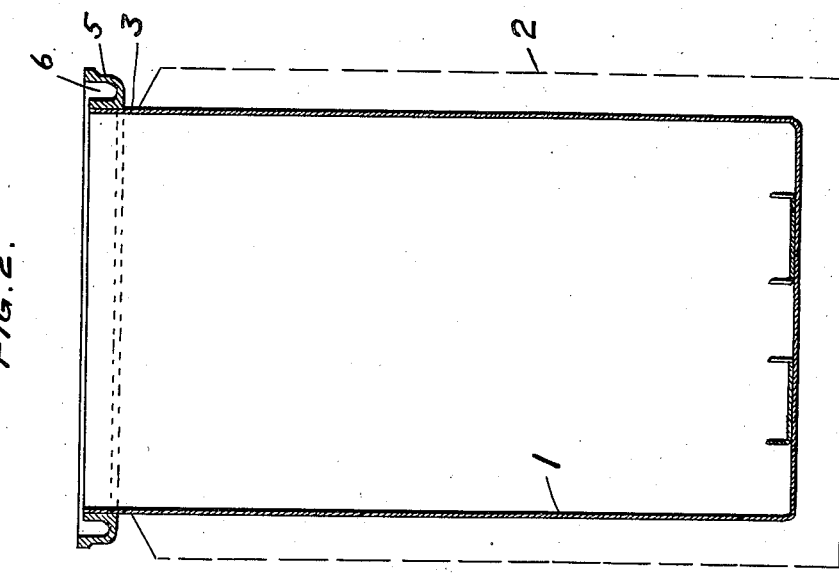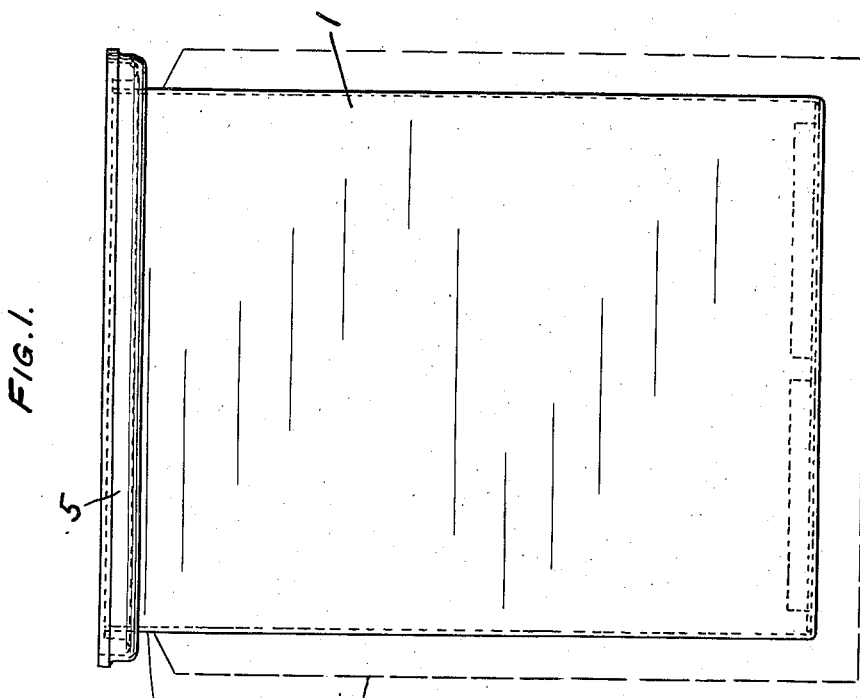

1,374,506.

Patented Apr. 12, 1921.
2 SHEETS—SHEET 2.

WITNESS:

INVENTOR
Herbert E. Hunt.
BY
Augustus B. Stoughton,
ATTORNEY.

UNITED STATES PATENT OFFICE.

HERBERT E. HUNT, OF PHILADELPHIA, PENNSYLVANIA.

STORAGE-BATTERY CONTAINER.

1,374,506.  Specification of Letters Patent.  Patented Apr. 12, 1921.

Application filed November 15, 1918. Serial No. 262,637.

*To all whom it may concern:*

Be it known that I, HERBERT E. HUNT, a citizen of the United States, residing at Philadelphia, in the county of Philadelphia and State of Pennsylvania, have invented a certain new and useful Storage-Battery Container, of which the following is a specification.

A secondary battery container is subjected to hard usage, especially in train lighting work, and it must meet the peculiar requirements of a storage battery, all without being too expensive in labor and cost of material.

It is the principal object of the present invention to provide a battery container which will meet those and other requirements hereinafter set forth.

The invention will be claimed at the end hereof but will be first described in connection with the embodiment of it chosen for illustration in the accompanying drawings forming part hereof and in which—

Figure 1, is an elevational view, partly diagrammatic, of a battery container embodying features of the invention.

Fig. 2, is a similar view but showing a sectional elevation.

Figure 3:
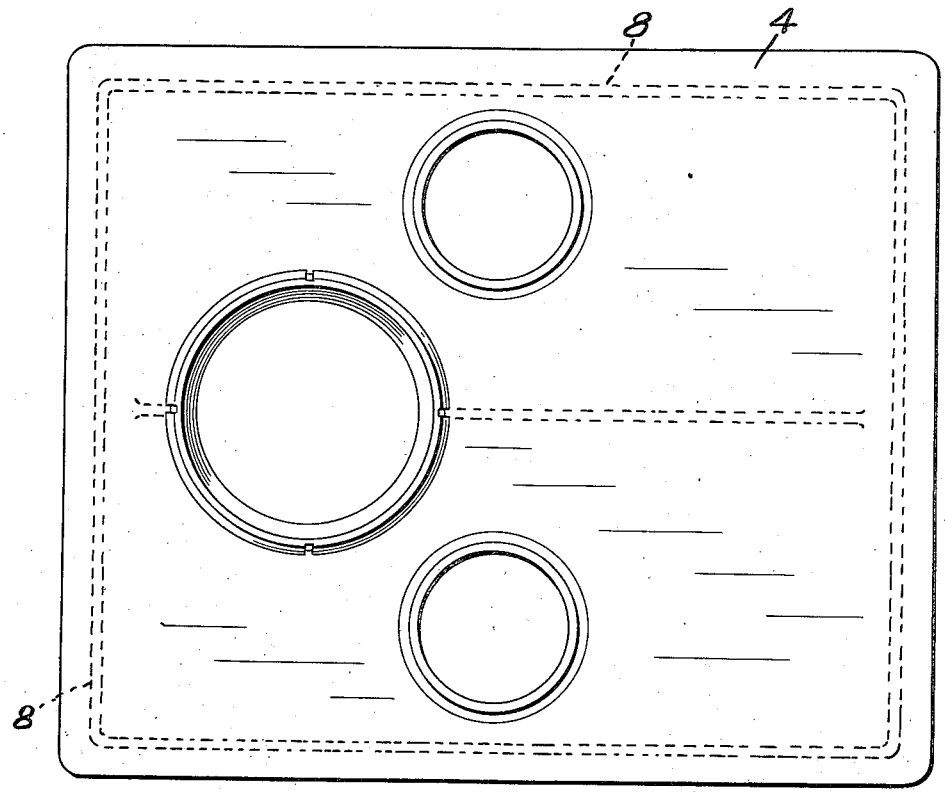
Fig. 3, is a top or plan view, drawn to an enlarged scale.
Figure 4:
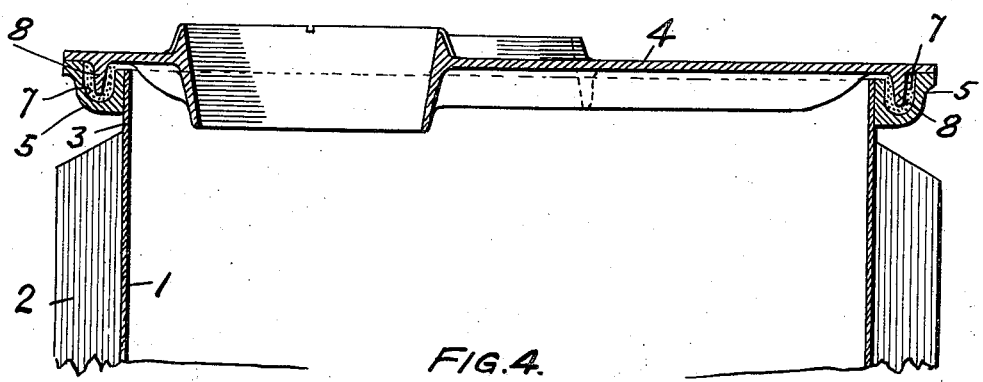
Fig. 4, is a sectional view of the upper part of the container.

In this invention the material employed is not a mere matter of choice, nor is the relative arrangement and proportion of parts, for these things are essential to the results. The vessel 1, is of sheet leaden material because that material is not brittle and so can mechanically stand the shocks and jars to which it is subjected and that material resists the action or reaction that takes place in the use of a storage battery. The receptacle 2, of wood is filled by the vessel 1, and supplies the necessary strength for supporting its lower and main body portion, for the wall of the vessel 1, is thin in the interest of lightness. It is important that the weight of the contents of the vessel 1, consisting of the plate structure and electrolyte, not shown but well understood, should be referred at the bottom of the vessel 1, to the floor of the receptacle 2, and for this purpose the wall of the vessel is extended above the top of the wall of the receptacle, as shown at 3. This extension of the wall of the vessel 1, being of thin sheet leaden metal, requires support as well as some means for accommodating a cover 4. Both of these requirements are met by the relatively massive crown 5, of leaden material which surrounds and is carried by the extension of the wall of the vessel 1. This crown 5, is spaced from the top of the wall of the receptacle 2, as shown at 3, and so the crown cannot engage the top of the wall which would or might in practice result in the weight of the contents of the vessel 1, being referred to its bottom wall. Again the crown lies inside of the plane of the outer surface of the wall of the receptacle and so is protected by the wall from being injured by collision with various objects. The crown is provided with a gutter 6, containing a sealing compound 7, into which dips a flange 8, on the underside of the cover 4. As shown the outer wall of the gutter extends farther than the inner wall, and this gives a good seat for the cover.

I claim:

A battery container comprising the combination of a crown having provided therein an open gutter and sufficiently massive to maintain the gutter in open condition, a cover provided with a flange adapted to enter the gutter of the crown, sealing compound in the gutter, an exterior wooden receptacle of which the wall is thicker than the crown to protect the same, and a relatively thin single walled leaden vessel fitting and contacting with the interior of and supported by the receptacle and having its single wall extended above the top of the receptacle wall and connected with the crown and constituting the sole means for supporting the latter spaced above and clear of the top of the receptacle wall thus referring the weight of the contents of the vessel to the bottom of the receptacle, substantially as described.

HERBERT E. HUNT.